(12) United States Patent
Chen et al.

(10) Patent No.: US 11,977,480 B2
(45) Date of Patent: May 7, 2024

(54) SCALING FACTORS FOR MEDIA MANAGEMENT OPERATIONS AT A MEMORY DEVICE

(71) Applicant: MICRON TECHNOLOGY, INC., Boise, ID (US)

(72) Inventors: Mikai Chen, San Jose, CA (US); Zhenlei Shen, Milpitas, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/854,797

(22) Filed: Jun. 30, 2022

(65) Prior Publication Data

US 2022/0334961 A1 Oct. 20, 2022

Related U.S. Application Data

(63) Continuation of application No. 17/005,164, filed on Aug. 27, 2020, now Pat. No. 11,403,216.

(51) Int. Cl.
*G06F 12/00* (2006.01)
*G06F 3/06* (2006.01)
*G06F 11/07* (2006.01)
*G06F 11/30* (2006.01)
*G06F 12/02* (2006.01)

(52) U.S. Cl.
CPC ........ *G06F 12/0246* (2013.01); *G06F 3/0614* (2013.01); *G06F 11/076* (2013.01); *G06F 11/0772* (2013.01); *G06F 11/3037* (2013.01); *G06F 12/0253* (2013.01); *G06F 2212/7211* (2013.01)

(58) Field of Classification Search
None
See application file for complete search history.

(56) References Cited

U.S. PATENT DOCUMENTS

2013/0061101 A1* 3/2013 Fitzpatrick ....... G11C 29/50004
714/E11.03
2017/0199769 A1 7/2017 Jain et al.

* cited by examiner

*Primary Examiner* — Daniel D Tsui
(74) *Attorney, Agent, or Firm* — LOWENSTEIN SANDLER LLP

(57) ABSTRACT

A scaling factor for a data unit of a memory device is obtained. The scaling factor corresponds to a difference between a first error rate associated with a first set of memory access operations performed at the data unit and a second error rate associated with a second set of memory access operations performed at the data unit. A media management operation is scheduled on the data unit in view of the scaling factor.

20 Claims, 7 Drawing Sheets

SCALING FACTORS FOR MEDIA MANAGEMENT OPERATIONS AT A MEMORY DEVICE

RELATED APPLICATIONS

This application is a continuation of U.S. patent application Ser. No. 17/005,164, filed Aug. 27, 2020, the entire contents of which is hereby incorporated by reference herein.

TECHNICAL FIELD

Embodiments of the disclosure relate generally to memory sub-systems, and more specifically, relate to scaling factors for media management operation at a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
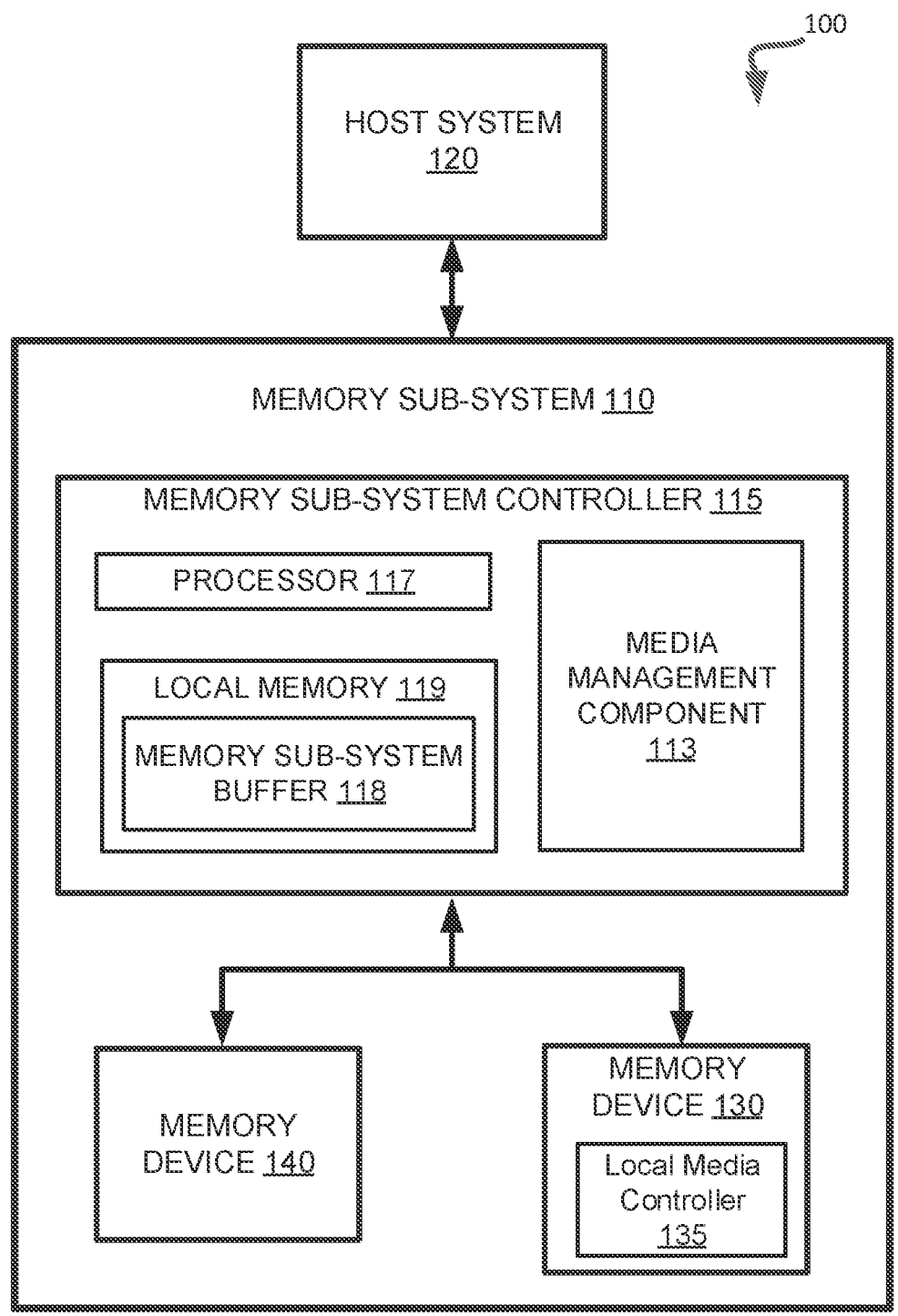
FIG. 1 illustrates an example computing system that includes a memory sub-system, in accordance with some embodiments of the present disclosure.

Aspects of the present disclosure are directed to scaling factors for media management operations at a memory device. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Memory devices at a memory sub-system can have particular properties that provide challenges in the operation of the memory sub-system. Some memory devices, such as non-volatile memory devices, can have limited endurance. For example, some memory devices can be written, read, or erased a finite number of times before the memory devices begin to physically degrade or wear and eventually fail.

A memory sub-system controller can perform media management operations to mitigate the amount of physical wear on the memory devices and lengthen the overall lifetime of the memory sub-system. For example, the memory sub-system controller can perform a media management operation (e.g., a wear leveling operation) to distribute the physical wear across data units of a memory device. A data unit refers to a particular amount of memory, such as a page or a block, of a memory device. To perform a media management operation, the memory sub-system controller can identify a data unit at a memory device that is subject to a significant amount of physical wear and can move data stored at the data unit to another data unit subject to a smaller amount of physical wear. In some instances, a data unit can be subject to a significant amount of physical wear if a large number of memory access operations, such as write operations (i.e., program operations) or read operations, are performed at the data unit. As such, in conventional systems, the memory sub-system controller can identify data units that are subject to large amounts of physical wear based, for example, on write counts for each data unit. A write count refers to a number of times that the memory sub-system controller performs a write operation at a particular data unit over the lifetime of the particular data unit.

In some instances, a data unit can also be subject to a significant amount of physical wear if a large number of read operations are performed at the data unit. The amount of physical wear to a data unit from a read operation is not equivalent to the amount of physical wear that from a write operation at the data unit. In some instances, the difference in the amount of physical wear to a data unit from a read operation and a write operation is caused by a difference in a voltage applied to memory cells of the data unit during the performance of each operation. For example, a larger voltage can be applied to memory cells of a data unit when a write operation is performed than is applied to the data unit when a read operation is performed, resulting in increased wear when the write operation is performed than when the read operation is performed.

As described above, in some conventional systems, the memory sub-system controller can identify data units that are subject to large amounts of physical wear based on write counts. The amount of physical wear to a data unit caused by read operations is not considered by the memory sub-system controller in determining whether to initiate a media management operation. If the memory sub-system controller does not initiate a media management operation at a data unit that is subject to a significant number of read operations (and a smaller number of write operations), the data unit can wear over time. Eventually, the data unit can become corrupted and data stored at the data unit becomes unreliable. The data unit can, therefore, be unusable, reducing the overall efficiency and increasing the overall latency of the memory sub-system.

In some conventional systems, the memory sub-system controller can consider the amount of physical wear caused by read operations in determining whether to initiate a media management operation for the data unit. In such systems, the memory sub-system controller can consider a read count (i.e., a number of times that the memory sub-system controller performs a read operation at a particular data unit) and a write count to determine whether to initiate a wear leveling operation for a particular data unit. For example, the memory sub-system controller can track a total number of read and write operations performed at a data unit and can initiate a wear leveling operation for the data unit in response to determining the total number of operations exceeds a threshold number. As described previously, the amount of physical wear that is caused from a read operation is not equivalent to the amount of physical wear that is caused from a write operation. As such, the memory sub-system controller in conventional systems might initiate a media management operation at a data unit having a large read count and a small write count, even though the data unit is not subject to a significant amount of physical wear. This unnecessary media management operation consumes a significant amount of system resources, which can reduce the number of system resources available for other processes at the memory sub-system. As a result, an overall memory sub-system efficiency decreases and the overall memory sub-system latency increases.

Aspects of the present disclosure address the above and other deficiencies by enabling a memory sub-system controller to use a scaling factor to determine whether to perform a media management operation at a data unit of a memory device. A scaling factor refers to a value indicating a difference in an amount of physical wear to the data unit caused by write operations and an amount of physical wear caused by read operations. In some embodiments, a scaling factor can correspond to a difference between an error rate for the data unit after performing a particular number of write operations and an error rate for the data unit after performing a particular number of read operations. The difference in the amount of physical wear to a data unit caused by write operations and the amount of physical wear caused by read operations can change over the life of a memory sub-system based on the overall amount of physical wear for the data unit. For example, during a first time period after initialization of the memory sub-system, a measured error rate for data at a data unit can be small, indicating that the amount of physical wear to the data unit is low. As a result, the difference in the amount of physical wear to the data unit caused by the write operation and the amount of physical wear caused by the read operation can be small. Over time, the error rate measured for the data at the data unit can increase, indicating that the amount of physical wear to the data unit is increasing. As such, during a second time period, the difference in the amount of physical wear caused by write operations and the amount of physical wear caused by read operations can be large. As a result, the scaling factor for the data unit can change over the life of the memory sub-system, as the amount of physical wear to the data unit increases.

At a first instance in time, the memory sub-system controller can determine whether to perform a media management operation for a data unit. A media management operation can include a wear leveling operation, a garbage collection operation, a folding operation, and so forth. The memory sub-system controller can determine a first scaling factor for the data unit in view of the amount of physical wear to the data unit at the first instance in time. The amount of physical wear to the data unit can correspond to the first number of write operations and read operations performed at the data unit. In some embodiments, the memory sub-system controller can determine the first scaling factor by identifying an entry of a scaling factor data structure that corresponds with the number of write operations and the number of read operations performed at the data unit and extracting the first scaling factor from the identified entry. In other or similar embodiments, the memory sub-system controller can provide the number of write operations and the number of read operations performed at the data unit as an input value to a scaling factor function and receive, as an output, the first scaling factor.

The memory sub-system controller can calculate a first media management metric for the data unit based on at least the first scaling factor, the first number of write operations, and the first number of read operations. The first media management metric corresponds to an overall amount of physical wear for the data unit at the first instance in time. The memory sub-system controller can use the first scaling factor to normalize the amount of physical wear caused by the first number of read operations in view of the first number of write operations. The memory sub-system controller can determine whether the first media management metric satisfies a media management criterion (e.g., exceeds a threshold metric value). In response to determining the first media management metric satisfies the media management criterion, the memory sub-system controller performs the media management operation at the data unit.

At a second instance in time, the memory sub-system controller can determine a second scaling factor for the data unit in view of the amount of physical wear to the data unit at the second instance in time (i.e., corresponding to a second number of write operations and read operations performed at the data unit). As the amount of physical wear to the data unit can be larger at the second instance in time than at the first instance in time, the second scaling factor is different (e.g., is larger) than the first scaling factor. The memory sub-system controller can calculate a second media management metric for the data unit based on the second scaling factor, the second number of write operations, and the second number of read operations, as previously described. In response to determining the second media management metric satisfies the media management criterion, the memory sub-system controller performs an additional media management operation at the data unit.

Advantages of the present disclosure include, but are not limited to, an increase in the overall lifetime of a memory sub-system. By calculating a media management metric based on the number of write operations and read operations performed at a data unit, the memory sub-system controller considers the amount of physical wear to the data unit caused by read operations as well as write operations. The memory sub-system controller, therefore, performs media management operations for a data unit that is subject to physical wear caused by a significant number of read operations and a small number of write operations. As a result, the lifetime of the data unit, as well as the reliability of data stored at the data unit, increases, which improves the overall efficiency and decreases the overall latency of the memory sub-system. Additionally, by using the scaling factor to normalize the effect of the read operations in view of the write operations, the memory sub-system controller is able to accurately identify data units that are subject to significant amounts of physical wear and initiate a media management operation. As a result, the number of unnecessary media management operations for data units at a memory device decreases, which increases the amount of system resources available to other processes. The increase in available system resources results in an increase in overall sub-system efficiency and a decrease in overall sub-system latency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes media management component 113 that manages the performance of media management operations for memory devices 130, 140 during operation of memory sub-system 110. In some embodiments, the memory sub-system controller 115 includes at least a portion of the media management component 113. For example, the memory sub-system controller 115 can include a processor 117 (processing device) configured to execute instructions stored in local memory 119 for performing the operations described herein. In some embodiments, the media management component 113 is part of the host system 110, an application, or an operating system. In other embodiments, local media controller 135 includes at least a portion of media management component 113 and is configured to perform the functionality described herein.

The media management component 113 can facilitate performing a media management operation at a data unit (e.g., a block, a page, etc.) at memory device 130, 140. A media management operation can include a wear leveling operation, a garbage collection operation, a folding operation, and so forth. It should be noted that, although some embodiments of the present disclosure are described with respect to a wear leveling operation, aspects of this disclosure can be applied to performing any media management operation (e.g., garbage collection operation, folding operation, etc.). Media management component 113 can perform a media management operation at a particular data unit in response to determining a media management metric associated with the data unit satisfies a media management criterion. The media management metric can be indicative of a level or amount of physical wear of the data unit at a particular instance in time. Media management component 113 can calculate a media management metric for a particular data unit based on a scaling factor for the data unit, a number of write operations performed at the data unit, and a number of read operations performed at the data unit. As described previously, the scaling factor an indicate a difference in the amount of physical wear to the data unit caused by write operations and the amount of physical wear caused by read operations. Media management component 113 can use the scaling factor to normalize the amount of physical wear caused by the number of read operations in view of the number of write operations when calculating the media management metric. In response to determining the media management metric satisfies the media management criterion, media management component 113 can perform the media management operation at the data unit. Further details with regards to the operations of the media management component 113 are described below.

Figure 2:
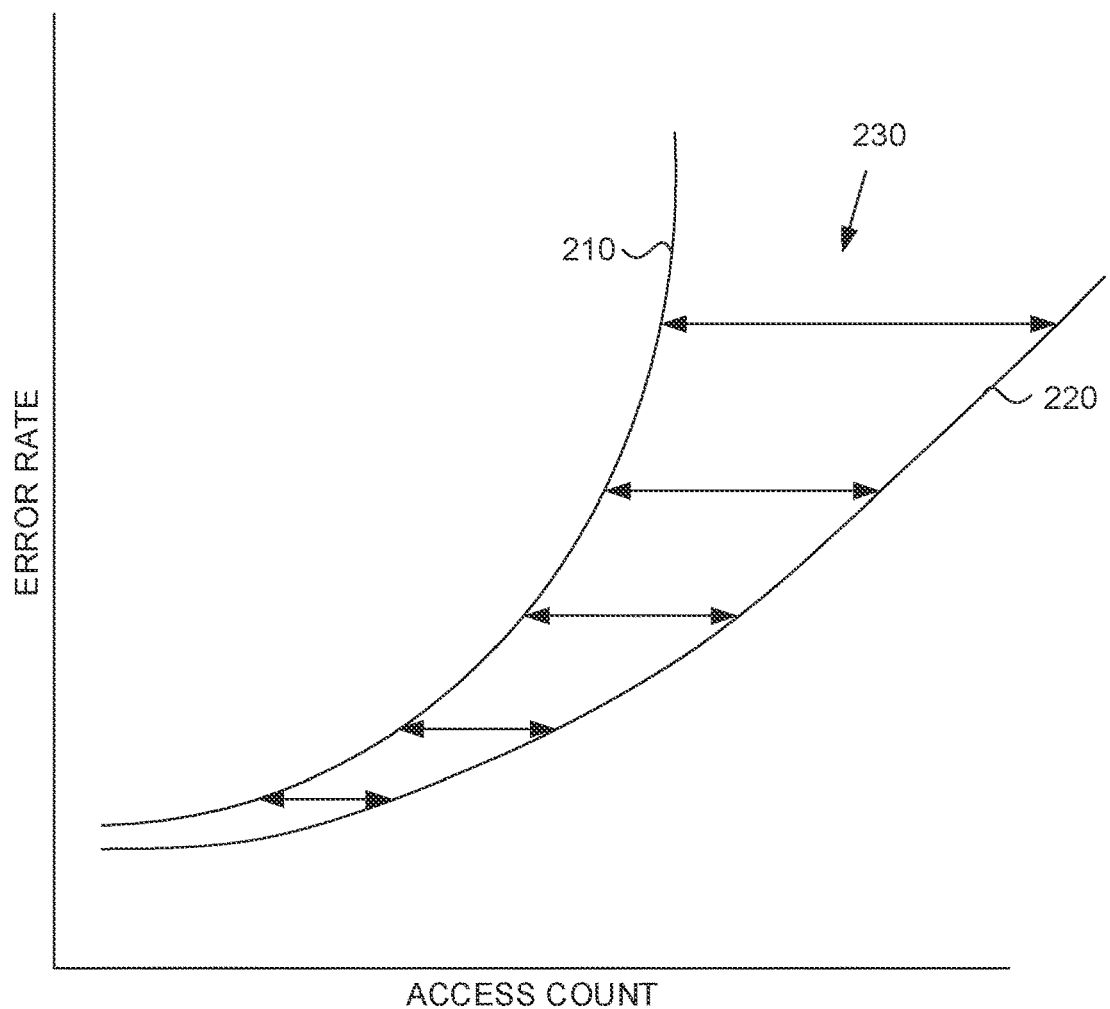
FIG. 2 illustrates a difference in the amount of physical wear to a data unit caused by write operations and an amount of physical wear caused by read operations, in accordance with some embodiments of the present disclosure.

FIG. 2 illustrates a graph 200 that indicates a difference in the amount of physical wear to a data unit caused by write operations and an amount of physical wear caused by read operations. The amount of physical wear caused to a data unit can correspond to a measured error rate (e.g., a bit error rate) for data stored at the data unit after a certain number of write and/or read operations are performed at the data unit. A first axis of graph 200 indicates a number of memory access operations (e.g., write operations, read operations, etc.) performed at the data unit and a second axis of graph 200 indicates a measured error rate for the data unit after a particular number of memory access operations are performed at the data unit.

In some embodiments, data associated with graph 200 can be generated by a processing device (e.g., memory sub-system controller 115) for a memory device at a memory sub-system. The processing device can perform a series of write operations at a data unit of the memory device. For one or more of the series of write operations, the processing device can measure an error rate for the data written to the data unit. Curve 210 of graph 200 illustrates the measured error rate after a certain number of write operations are performed at the data unit. As illustrated in FIG. 2, the error rate for data stored at the data unit increases with the number write operations performed at the data unit. The processing device can also perform a series of read operations at a data unit of the memory device (i.e., the same or a different data unit used to perform the write operations) and can measure the error rate for the data read from the data unit. Curve 220 illustrates the measured error rates after a certain number of read operations are performed at the data unit. As illustrated in FIG. 2, the error rate for data stored at the data unit also increases with the number of read operations performed at the data unit. However, curve 220 increases at a slower rate than curve 210. The difference in the increase of curves 210 and 220 corresponds to a difference 230 in the amount of physical wear caused by write operations and the amount of physical wear caused by read operations.

The processing device can use the difference 230 between curve 210 and curve 220 to generate a set of scaling factors for a data unit. In some embodiments, the processing device of a particular memory sub-system can use difference 230 to generate the set of scaling factors for data units of a memory device at the memory sub-system. For example, memory sub-system controller 115 can use difference 230 to generate the set of scaling factors for memory devices 130, 140. In other or similar embodiments, the processing device can use difference 230 to generate the set of scaling factors for data units of a memory device at a different memory sub-system. For example, the memory device including the data units can be a sample memory device of a manufacturing lot of memory devices and the processing device can use difference 230 to generate a set of scaling factors for other memory devices of the manufacturing lot.

In some embodiments, each of the set of scaling factors can correspond with a difference between the error rate for the data unit after a particular number of write operations have been performed and the error rate after the same or a similar number of write operations have been performed. For example, after 100 read operations have been performed, the error rate for a particular data unit can be approximately 0.0001 bit errors per second. After 100 write operations have been performed, the error rate for a corresponding data unit can be approximately 0.0002 bit errors per second. The processing device can determine a scaling factor for the data units at a memory device corresponding to the difference between the error rates after 100 write operations and 100 read operations. For example, the processing device can determine the scaling factor is a ratio of the error rate for 100 write operations and the ratio for 100 read operations (e.g., ½ or 0.5). In another example, after 1,000 read operations have been performed, the error rate for a particular data unit can be 0.001 bit errors per second. After 1,000 write operations have been performed, the error rate for a corresponding data unit can be 0.01 bit errors per second. The processing device can determine the scaling factor is a ratio of the error rate for 1000 write operations and the ratio for 1000 read operations (e.g., ¹⁄₁₀ or 0.1).

The processing device can generate a set of scaling factors for data units for multiple access counts, in accordance with previously described embodiments. A memory sub-system controller (e.g., memory sub-system controller 115) can use the generated set of scaling factors to determine a particular scaling factor for calculating a media management metric based on a particular number of write operations and read operations performed at a data unit, in accordance with embodiments described herein.

It should be noted that, in some embodiments, curve 220 can increase at the same rate as curve 210. In such embodiments, difference 230 between curve 220 and curve 210 can be a constant value (or approximately a constant value) regardless of the number of write operations or read operations that are performed at a data unit. The processing device can determine a single scaling factor based on the constant difference 230 between curve 220 and curve 210, in accordance with previously described embodiments. A memory sub-system controller (e.g., memory sub-system controller 115) can use the scaling factor in place of the set of scaling factors for calculating a media management metric, in accordance with embodiments described herein.

Figure 3:
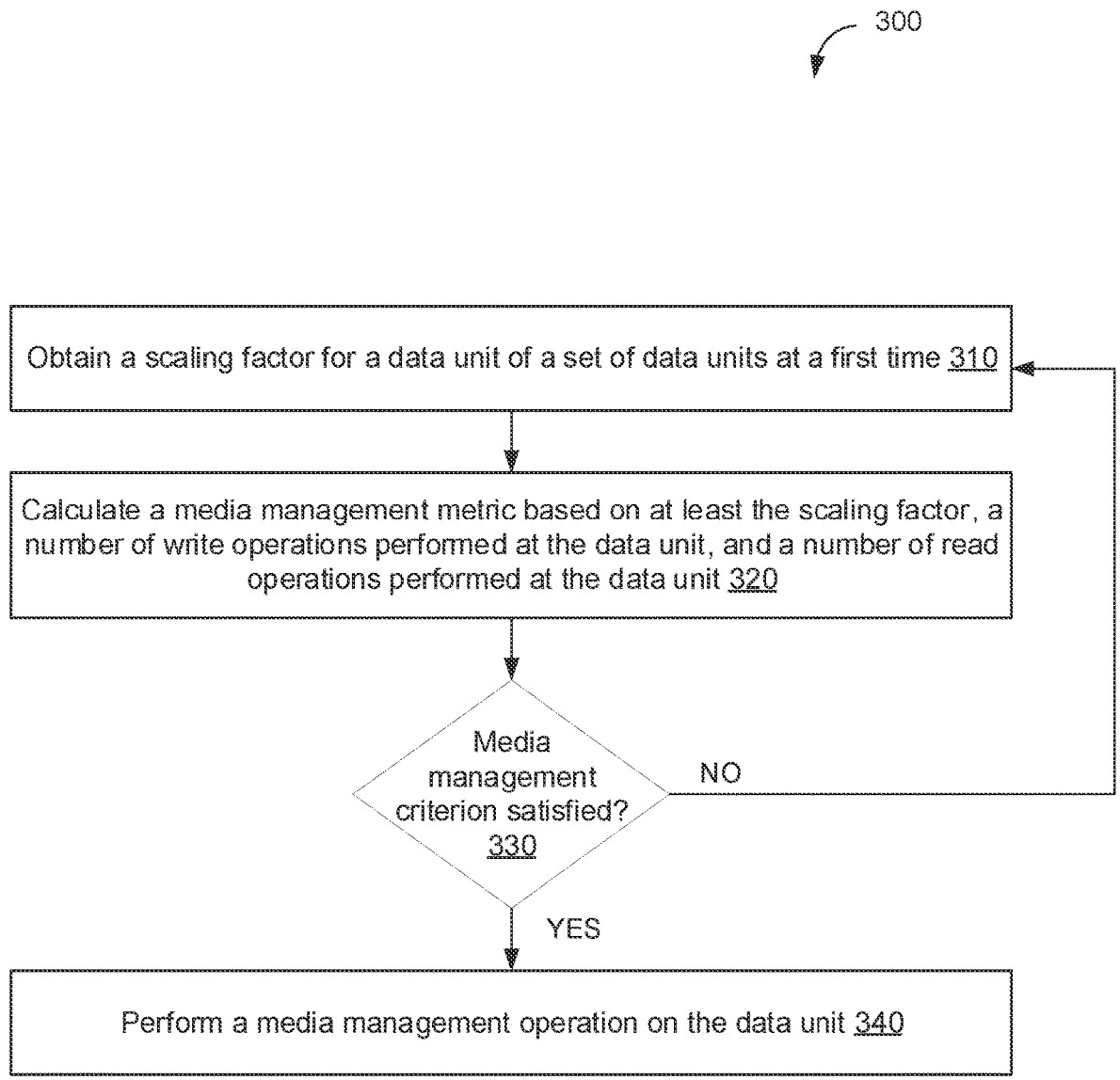
FIG. 3 is a flow diagram of an example method to determine whether to perform a media management operation on a data unit of a memory device, in accordance with embodiments of the present disclosure.

FIG. 3 is a flow diagram of an example method 300 to determine whether to perform a media management operation on a data unit of a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5A:
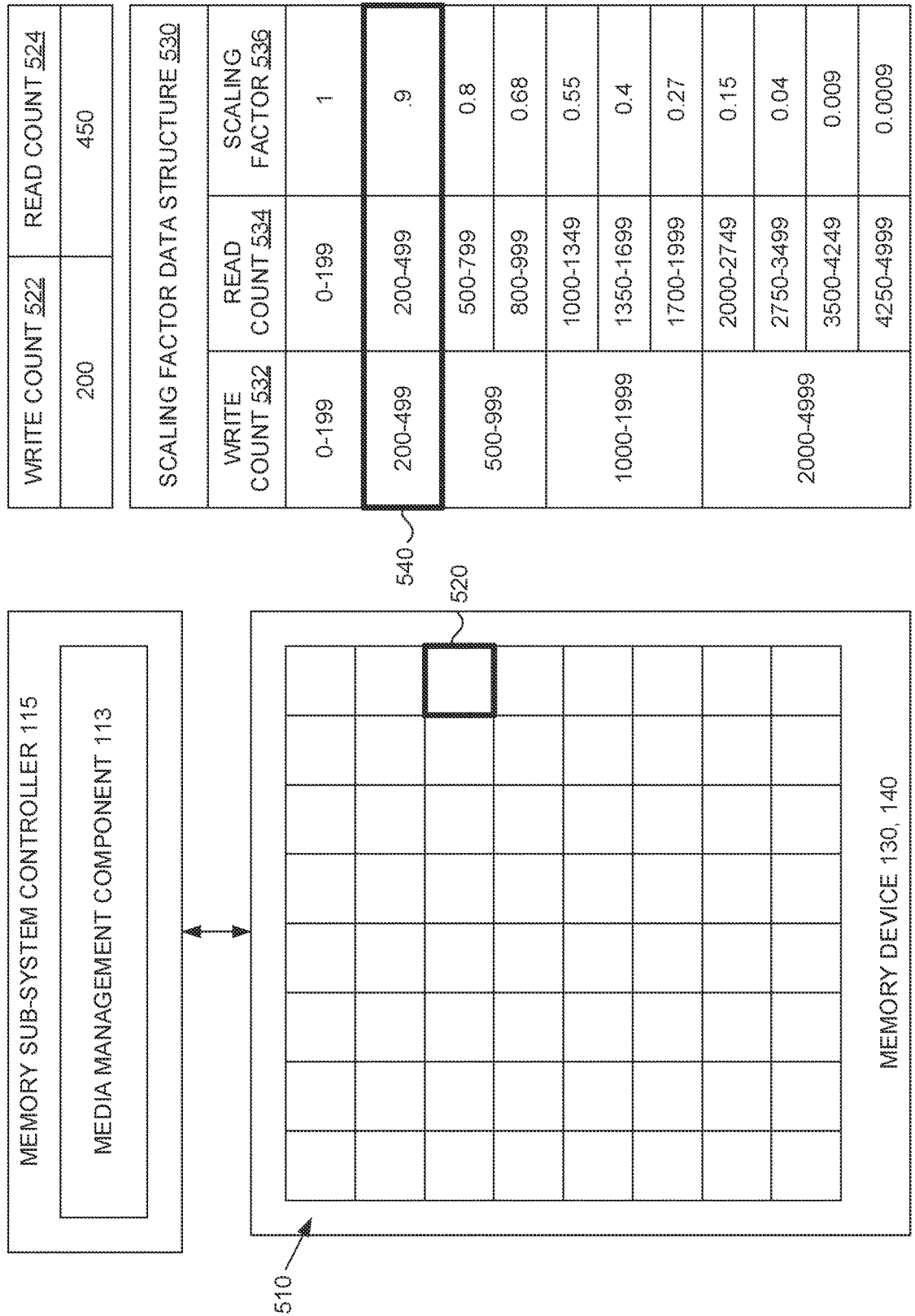
FIGS. 5A-5B illustrate determining a scaling factor for a memory management operation performed at a memory device, in accordance with some embodiments of the present disclosure.

At operation 310, the processing logic obtains a scaling factor for a data unit of a set of data units at a first time. As described previously, the scaling factor refers to a value that indicates a difference in an amount of physical wear to the data unit caused by write operations and an amount of physical wear to the data unit caused by read operations. The amount of physical wear to the data unit can correspond to a certain number of write operations and read operations performed at the data unit. FIG. 5A illustrates a set of data units 510 at a memory device 130, 140. As described previously, a data unit can refer to a particular amount of memory, such as a page or a block, of memory device 130, 140. During operation of a memory sub-system, memory sub-system controller 115 can perform memory access operations (e.g., write operations, read operations, etc.) at a data unit. In some embodiments, media management component 113 can track the number of write operations and read operations performed at the data unit. For example, media management component 113 can maintain a write operation counter 522 and a read operation counter 524 for each data unit of the set of data units 510. As illustrated in FIG. 5A, the write operation counter 522 value for data unit 520 is 200 and the read operation counter 524 value for data unit 520 is 450. In other or similar embodiments, media management component 133 does not track the number of memory access operations performed at the data unit and, instead, receives the number of read operations and read operations from another component (e.g., of memory sub-system controller 115).

In some embodiments, media management component 113 can obtain the scaling factor using a scaling factor data structure 530. Scaling factor data structure 530 can include a set of entries that each correspond to a scaling factor of a set of scaling factors described with respect to FIG. 2. In some embodiments, each entry can include a write count field 532, a read count field 534, and a scaling factor field 536, as illustrated. In other or similar embodiments, each entry can include a write count filed 532 or a read count field 534, in addition to a scaling factor field 526. Media management component 113 can obtain a scaling factor to use for calculating a media management metric by identifying an entry of scaling factor data structure 530 that corresponds to the number of write operations, indicated by write count field 532, and/or the number of read operations, indicated by read count field 534, performed for a particular data unit and extracting the scaling factor from the scaling factor field 436 of the identified entry. For example, media management component 113 can identify entry 540 which corresponds with the number of write operations performed at data unit 520 (e.g., 200) and the number of read operations performed at data unit 520 (e.g., 450). In response to identifying entry 540, media management component 113 can extract the scaling factor of 0.9.

In other or similar embodiments, media management component 113 can obtain the scaling factor using a scaling factor function. For example, media management component 113 can provide, as an input to the scaling factor function, the number of write operations performed at data unit 520 (e.g., 200) and the number of read operations performed at data unit 520 (e.g., 450). Media management component 113 can receive, as an output, the scaling factor of 0.9.

Referring back to FIG. 3, at operation 320, the processing logic calculates a media management metric for the data unit. The processing logic can calculate the media management metric based on the determined scaling factor for the data unit, a number of write operations performed at the data unit, and a number of read operations performed at the data unit. As described previously, processing logic can use the scaling factor to normalize the amount of physical wear caused by the read operations in view of the write operations when calculating the media management metric. For example, the processing logic can normalize the amount of physical wear caused by the read operations by performing and operation with respect to the number of read operations performed at the data unit and the determined scaling factor (e.g., by multiplying the number of read operations and the scaling factor together). The processing logic can use the normalized number of read operations and the number of write operations to calculate the media management metric for the data unit.

At operation 330, the processing logic determines whether the calculated media management metric satisfies a media management criterion. In some embodiments, the processing logic can determine that the media management metric satisfies the media management criterion in response to determining the media management metric exceeds a threshold metric value. In response to determining the media management criterion is not satisfied, the processing logic returns to operation 310. In response to determining the media management criterion is satisfied, the processing logic proceeds to operation 340. At operation 340, the processing logic performs a media management operation (e.g., wear leveling operation, garbage collection operation, folding operation, etc.) on the data unit.

Figure 5B:
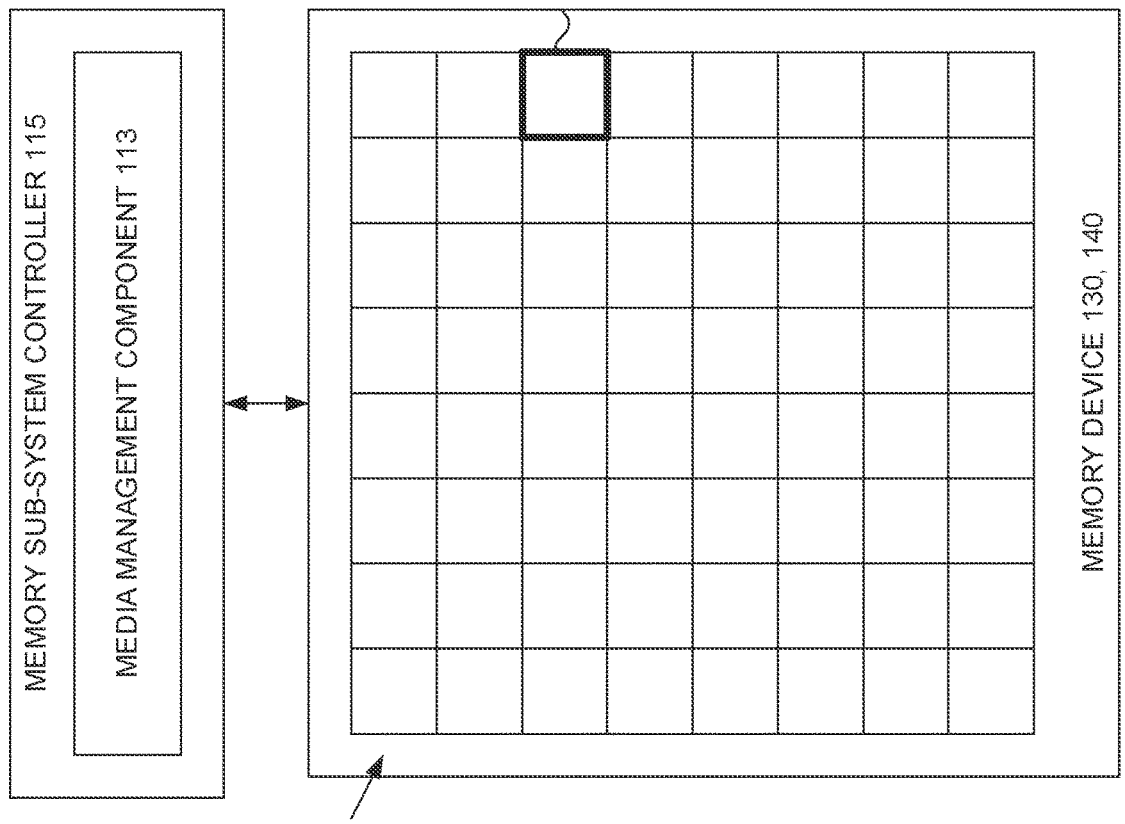

At a second time, the processing logic can determine another scaling factor for the data unit (referred to as a second scaling factor). Media management component 113 can determine the number of read operations and the number of write operations performed at the data unit at the second time, in accordance with previously described embodiments. As illustrated in FIG. 5B, the number of write operations performed at data unit 520 is 1200 and the number of read operations performed at data unit 520 is 1850. Media management component 113 can determine the scaling factor for data unit 520 based on the number of write operations and read operations performed at data unit 520, as previously described. For example, media management component 113 can identify entry 550 of scaling factor data structure 530, which corresponds to the number of write operations and read operations performed at data unit 520 at the second time. Media management component 113 can extract the scaling factor of 0.27 from scaling factor field 536 of entry 550 and calculate the media management metric based on the extracted scaling factor and the number of write and read operations performed at data unit 520, in accordance with previously described embodiments. In response to determining the media management metric satisfies the media management criterion, media management component 113 can perform an additional media management operation at data unit 520.

In some embodiments, scaling factor data structure 530 does not include an entry that corresponds to the number of write operations and read operations performed at a data unit at a particular time. For example, at the second time, the number of write operations can be 200 and the number of read operations can be 1850. In such embodiments, media management component 113 can determine the scaling factor for the data unit based on the scaling factor included in the entry for the number of write operations or the number of read operations. In accordance with the previous example, the media management component 113 can determine the scaling factor is 0.9 (i.e., from the entry for 200 write operations) or 0.27 (i.e. from the entry for 1850 write operations). In other or additional embodiments, media management component 113 can determine the scaling factor by identifying the maximum scaling factor from both entries for the number of write operations or the number of read operations, respectively. In accordance with the previous example, the media management component 113 can determine the scaling factor is 0.9, as the scaling factor of 0.9 from the entry for 200 write operations is larger than the scaling factor of 0.27 from the entry for 1850 write operations.

Figure 4:
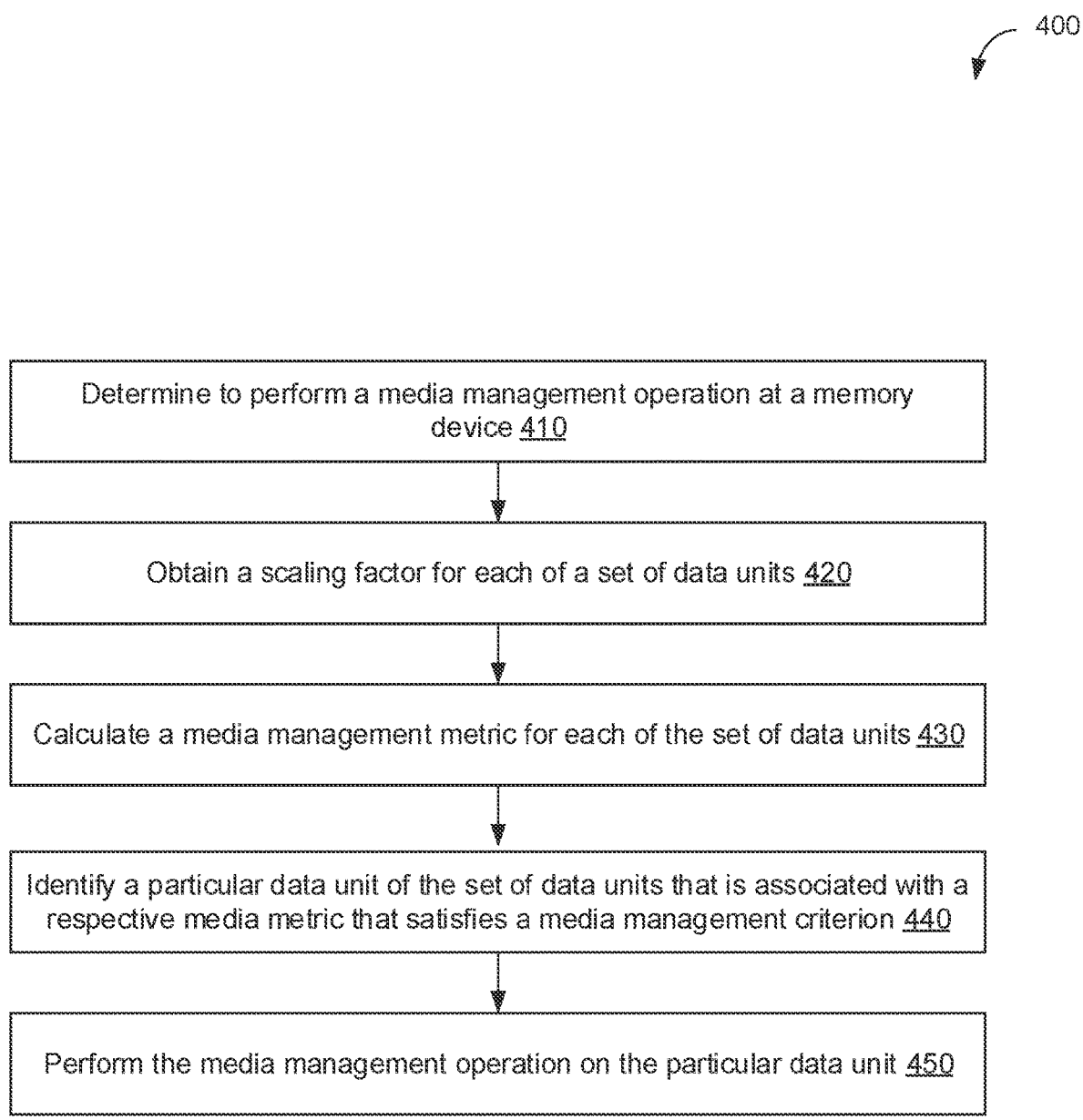
FIG. 4 is a flow diagram of an example method to identify a data unit of a memory device for performing a media management operation, in accordance with some embodiments of the present disclosure.

FIG. 4 is a flow diagram of an example method 400 to identify a data unit of a memory device for performing a media management operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic determines to perform a media management operation at a memory device. In some embodiments, the processing logic can determine to perform the media management operation in response to receiving a request to perform the media management operation (e.g., from a host system). In other or similar embodiments, the processing logic can determine to perform the media management operation in view of a media management policy for the memory sub-system. For example, the media management policy can include an instruction that causes a media management operation to be performed at a particular interval (e.g., every minute, etc.).

At operation 320, the processing logic obtains a scaling factor for each of a set of data units. The scaling factor can be associated with a particular number of read operations and write operations performed at each data unit. The processing logic can obtain the scaling factor based on the number of read operation and write operations (e.g., using a scaling factor data structure, using a scaling factor function, etc.) as previously described. At operation 330, the processing logic calculates a media management metric for each of the set of data units. At operation 340, the processing logic identifies a particular data unit of the set of data units that is associated with a respective media management metric that satisfies a media management criterion. In some embodiments, the processing logic can determine that a media management metric satisfies the media management criterion in response to determining the media management metric exceeds the threshold value. In other or similar embodiments, the processing logic can determine the media management metric satisfies the media management criterion in response to determining the media management metric is larger than other media management metrics for other data units.

At operation 350, the processing logic performs the media management operation on the particular data unit. As described previously, the media management operation can include a wear leveling operation, a garbage collection operation, and so forth. In some embodiments, multiple data units of the set of data units can be associated with a media management metric that satisfies the media management criterion. As such, the processing logic can perform the media management operation for each of the multiple data units.

Figure 6:
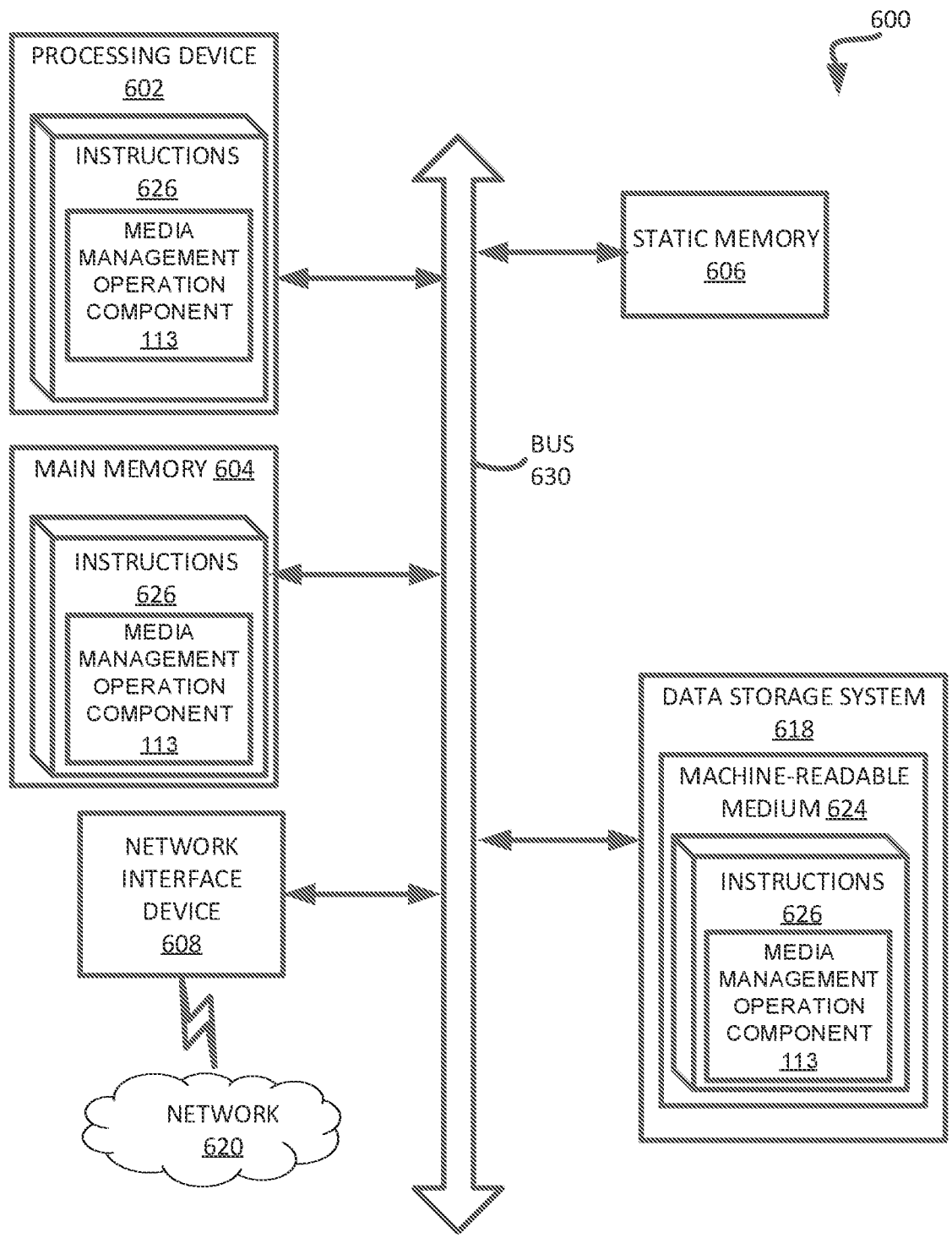
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media management operation component (e.g., the media management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   performing a first set of memory access operations to access host data at a data unit of a memory device, in accordance with a memory access request from a host system;
   responsive to detecting that the performance of the first set of memory access operations is completed, updating a scaling factor for the data unit based on a difference between a first error rate associated with the performance of the first set of memory access operations with respect to the host data at the data unit and a second error rate associated with a prior performance of a second set of memory access operations at the data unit; and
   scheduling a media management operation on the data unit in view of the scaling factor.

2. The method of claim 1, wherein the first set of memory access operations comprise one or more write operations and the second set of memory access operations comprise one or more read operations.

3. The method of claim 1, wherein scheduling the media management operation on the data unit comprises:
   calculating a media management metric based on the scaling factor, the first set of memory access operations, and the second set of memory access operations; and
   responsive to determining that the media management metric satisfies a media management criterion, causing the media management operation to be performed on the data unit.

4. The method of claim 1, further comprising obtaining the scaling factor for the data unit by:
   identifying an entry of a scaling factor data structure corresponding to the first set of memory access operations and the second set of number of memory access operations; and
   extracting the scaling factor from the identified entry.

5. The method of claim 1, further comprising obtaining the scaling factor for the data unit by:
   providing an indication of a first number of memory access operations of the first set of memory access operations and an indication of a second number of operations of the second set of memory access operations as input to a scaling factor function; and
   identifying the scaling factor from one or more outputs of the scaling factor function.

6. The method of claim 1, further comprising:
   detecting that at least a third set of memory access operations have been performed at the data unit;
   further updating the scaling factor for the data unit in view of the at least the third set of memory access operations; and
   scheduling an additional media management operation on the data unit in view of the scaling factor.

7. The method of claim 1, wherein the media management operation comprises at least one of: a wear leveling operation, a garbage collection operation, or a folding operation.

8. A system comprising:
   a memory device; and
   a processing device coupled to the memory device, the processing device to perform operations comprising:
      performing a first set of memory access operations to access host data at a data unit of a memory device, in accordance with a memory access request from a host system;
      responsive to detecting that the performance of the first set of memory access operations is completed, updating a scaling factor for the data unit based on a difference between a first error rate associated with the performance of the first set of memory access operations at the data unit and a second error rate associated with a prior performance of a second set of memory access operations at the data unit; and scheduling a media management operation on the data unit in view of the scaling factor.

9. The system of claim 8, wherein the first set of memory access operations comprise one or more write operations and the second set of memory access operations comprise one or more read operations.

10. The system of claim 8, wherein scheduling the media management operation on the data unit comprises:

calculating a media management metric based on the scaling factor, the first set of memory access operations, and the second set of memory access operations; and responsive to determining that the media management metric satisfies a media management criterion, causing the media management operation to be performed on the data unit.

11. The system of claim 8, wherein the operations further comprise obtaining the scaling factor for the data unit by:

identifying an entry of a scaling factor data structure corresponding to the first set of memory access operations and the second set of number of memory access operations; and extracting the scaling factor from the identified entry.

12. The system of claim 8, further comprising obtaining the scaling factor for the data unit by:

providing an indication of a first number of memory access operations of the first set of memory access operations and an indication of a second number of operations of the second set of memory access operations as input to a scaling factor function; and identifying the scaling factor from one or more outputs of the scaling factor function.

13. The system of claim 8, wherein the operations further comprise:

detecting that at least a third set of memory access operations have been performed at the data unit;

further updating the scaling factor for the data unit in view of the at least the third set of memory access operations; and scheduling an additional media management operation on the data unit in view of the scaling factor.

14. A non-transitory computer-readable storage medium comprising instructions that, when executed by a processing device, cause the processing device to perform operations comprising:

performing a first set of memory access operations to access host data at a data unit of a memory device, in accordance with a memory access request from a host system;

responsive to detecting that the performance of the first set of memory access operations is completed, updating a scaling factor for the data unit based on a difference between a first error rate associated with the performance of the first set of memory access operations at the data unit and a second error rate associated with a prior performance of a second set of memory access operations at the data unit; and scheduling a media management operation on the data unit in view of the scaling factor.

15. The non-transitory computer-readable storage medium of claim 14, wherein the first set of memory access operations comprise one or more write operations and the second set of memory access operations comprise one or more read operations.

16. The non-transitory computer-readable storage medium of claim 14, wherein scheduling the media management operation on the data unit comprises:

calculating a media management metric based on the scaling factor, the first set of memory access operations, and the second set of memory access operations; and responsive to determining that the media management metric satisfies a media management criterion, causing the media management operation to be performed on the data unit.

17. The non-transitory computer-readable storage medium of claim 14, wherein the operations further comprise obtaining the scaling factor for the data unit by:

identifying an entry of a scaling factor data structure corresponding to the first set of memory access operations and the second set of number of memory access operations; and extracting the scaling factor from the identified entry.

18. The non-transitory computer-readable storage medium of claim 14, further comprising obtaining the scaling factor for the data unit by:

providing an indication of a first number of memory access operations of the first set of memory access operations and an indication of a second number of operations of the second set of memory access operations as input to a scaling factor function; and identifying the scaling factor from one or more outputs of the scaling factor function.

19. The non-transitory computer-readable storage medium of claim 14, wherein the operations further comprise:

detecting that at least a third set of memory access operations have been performed at the data unit;

further updating the scaling factor for the data unit in view of the at least the third set of memory access operations; and scheduling an additional media management operation on the data unit in view of the updated scaling factor.

20. The non-transitory computer-readable storage medium of claim 14, wherein the media management operation comprises at least one of: a wear leveling operation, a garbage collection operation, or a folding operation.

* * * * *